US005877698A

United States Patent [19]

Kusnier et al.

[11] Patent Number: 5,877,698

[45] Date of Patent: Mar. 2, 1999

[54] SYSTEM FOR SELECTIVELY TRANSMITTING MESSAGES TO PASSERS-BY

[76] Inventors: Jaime Hector Kusnier, San Juan 3928 (1233); José Kulesz, AV. Libertador 380; Alberto José Machado, Viamonte 632, all of Buenos Aires, Argentina

[21] Appl. No.: 595,315

[22] Filed: Feb. 1, 1996

[30] Foreign Application Priority Data

Feb. 2, 1995 [AR] Argentina ................................ 330,906

[51] Int. Cl.[6] ............................. G05B 1/00; G05B 25/08; G05B 5/22; G06F 7/04

[52] U.S. Cl. ................................ 340/825.35; 340/286.01; 340/825.36; 340/692

[58] Field of Search ......................... 340/825.35, 825.49, 340/825.54, 539, 825.72, 825.44, 825.73; 455/343, 572, 692, 462, 59; 250/206.1; 380/34

[56] References Cited

U.S. PATENT DOCUMENTS 5,264,822 11/1993 Vogelman et al. ................. 340/825.35

5,406,271 4/1995 Sonnendorfer et al. ........... 340/825.35

*Primary Examiner*—Brian Zimmerman

*Assistant Examiner*—Jean B. Jeanglaude

*Attorney, Agent, or Firm*—Kile McIntyre & Harbin

[57] ABSTRACT

A system having several transmitters at fixed locations, such as in a supermarket, and a mobile receiver installed in each push-cart. Whenever a push-cart comes within the range of a transmitter, an exclusive link is set up therebetween for relaying to the receiver an audio message prerecorded in the transmitter for the push-cart user to hear. The receivers beam each "listening" control signals within a predetermined range, in response to which a transmitter within the range of one such receiver relays back a "sending" control signal and sends its prerecorded message which the receiver tunes into. The control signals are single-frequency signals modulating infrared carriers. The message signals are recorded preferably in analog solid-state memories and frequency-modulating radio or infrared carriers in different embodiments. Other uses include public galleries and museums, where one such receiver may be carried by the user instead of installing in a cart.

35 Claims, 12 Drawing Sheets

SYSTEM FOR SELECTIVELY TRANSMITTING MESSAGES TO PASSERS-BY

BACKGROUND OF THE INVENTION

The present invention refers to a communications system for selectively sending prerecorded messages from a transmitter unit to mobile, passing-by receiver unit. In particular the invention is related to selectively sending voice messages from at least one but generally several fixed transmitters to randomly roaming receivers individually coming within range of a particular transmitter, wherein each message content is customized or dependant on the location of the transmitter sending it. More particularly, the present invention is directed to selectively beaming messages of interest to people of the general public passing by predetermined locations or stations.

The present invention may be put to different applications, such as educational, cultural or commercial. For instance, visitors to a museum may listen to prerecorded summaries of each object as they walk by or stop to look. Another application selectively beams publicity material to prospective buyers, such as to entice them to sale offers and the like.

One such application particularly targeted by the present invention is inside a supermarket wherein a plurality of transmitters are located in relation to particular products or brands and each push-cart, or at least a great number thereof, is provided with a stand-alone receiver unit. Each transmitter contains at least one customized voice message, such as a special discount offer for a particular product on a shelf nearby or advertising a brand in the midst, which it may transmit to a selected receiver once the latter has been detected within the range of the former and a communication link, such as radio or infrared, is set up therebetween. The cart-mounted receiver may contain a small loudspeaker for relaying the message to the supermarket customer. In other applications, such as in the museum referred to hereinabove, the receiver may be a portable unit to be carried by the visitor and she or he may be provided with earphones to avoid disturbing people nearby.

Hence the invention is directed mainly to relaying different messages to people according to their whereabouts at each moment. In cases such as in a supermarket, the invention affords an attractive improvement over the system sometimes used heretofore consisting in sequentially broadcasting a same message to everyone. Such a system is of limited use, cannot be focussed precisely on people in front of particular merchandise and its penetration is relatively superficial, particularly since it is generally repetitive.

SUMMARY OF THE INVENTION

An object of the present invention is to provide a system of one or more generally fixed transmitter units and one or more generally roaming reciever units capable of establishing the presence of one nearby the other and thereafter transmitting a message prerecorded in the transmitter message to the receiver unit.

Another object of the present invention is to provide method and means for each transmitter to detect a receiver in the range thereof and hook both up to transmit a message signal from the transmitter to the receiver.

These and other objects and advantages of the present invention are achieved by means of a system comprising one or more generally fixed transmitter units for wirelessly transmitting recorded information messages, such as voice messages, in a first area proximal to each transmitter unit and one or more mobile receiver units for roaming around a second area including the first area for receiving the transmitted messages when in the first area. According to the invention, the system comprises means in each of the transmitter and receiver units for selectively establishing a link for the receiving unit to receive the information messages from the transmitter unit when inside the first area, by means of a method comprising the steps of: sending a "listening" control signal from the receiving means for pickup by the transmitting means whenever the receiving means substantially enters the first area; picking the "listening" signal up at the transmitting means and responding thereto by transmitting the information message from the transmitting means into the first area; enabling the receiving means to receive the message from the transmitting means; detecting reception of the information message at the receiving means and, in response thereto, continue sending the "listening" control signal to the transmitting means; continue transmitting the information message into the first area while the "listening" signal is picked up at the transmitting means; and terminating the link between the transmitting and receiving means when the transmitting means stops receiving the "listening" control signal.

In a preferred embodiment, the method further comprises: issuing a "sending" control signal from the transmitting means into the first area in response to picking the "listening" signal up at the transmitting means, detecting the "sending" control signal at the receiving means and responding thereto by enabling reception of the information message thereat, and stopping issue of the "sending" control signal upon termination of the transmitted message. More preferably, each transmitting means is adjusted to transmit at a respective preselected transmission carrier frequency and the "sending" control signal encodes the carrier frequency of the message to be transmitted which is decoded by a "listening" receiving means to tune its receiver stage to the right carrier frequency.

In preferred embodiments disclosed hereinafter, the recorded messages are transmitted wirelessly via radio signals and the control signals are transmitted either by radiofrequency or infrared signals.

Each transmitter unit for the system of the invention comprises: storage means for storing signals defining the contents of at least one information message pertaining thereto, receiving means for receiving a "listening" control signal from one such receiver unit entering into the first area, detecting means for detecting the presence of the "listening" control signal at the receiving means and generating in response thereto a "transmit enable" signal, and transmitting means responsive to the "transmit enable" signal to retrieve an information message from the storage means and transmit the retrieved message into the first area. Preferably, the storage means contain a plurality of the information messages recorded therein and each transmitter unit further includes selector means for sequentially selecting one of the recorded messages in response to the detecting means detecting a new "listening" control signal in the receiving means in the transmitter unit. Furthermore, each mobile receiver unit of the invention comprises: transmitting means for sending out a "listening" control signal for detection by the receiving means of one such transmitter unit, receiving means for receiving the information message, and output means for relaying the received message in useful form.

In the preferred embodiments, each transmitter unit further includes: control transmitting means for transmitting a "sending" control signal in response to receiving the "listening" control signal from one such receiver unit, means for setting a carrier frequency for the first transmitting means thereof to transmit the information message, and means for encoding the carrier frequency in the "sending" signal; and each receiver unit further includes: second receiving means for detecting the "sending" control signal from the transmitter unit and generating an "audio enable" signal in response thereto, detector means for sampling the output from the first receiving means and deactivating the "audio enable" signal in response to termination or interruption of the received message, the detector means further responding to the presence of the message at the output of the first receiving means to enable the transmitting means of the receiver unit to continue sending out the "listening" control signal to the receiving means of the transmitter unit, and decoding means for decoding the carrier frequency in the "sending" signal for tuning the first receiving means thereof to the decoded carrier frequency.

In the preferred embodiment, each carrier-frequency setting means comprises a tone generator connected to the control transmitting means to cause the latter to transmit the "sending" signal of a control frequency encoding the carrier frequency, and the decoding means in the receiver unit comprises a frequency decoder circuit to recover the carrier frequency. For instance, the carrier frequency may be set to one of two preset carrier frequencies and the frequency decoder circuit comprises two frequency discriminator devices each tuned to a different preset frequency of the tone generator.

The receiver units may further include timer means connected to inhibit the transmitting means from sending the "listening" control signal during a preselected time after the detector means determines that reception of the transmitted message has terminated.

According to the specific application of the invention, the receiver units may be mounted on supermarket push-carts and each include loudspeakers for propagating the transmitted messages in audible form to cart users, or otherwise be user-portable and be connected to earphones to enable a user to hear the transmitted message in audible form without disturbing other parties.

DESCRIPTION OF THE PREFERRED EMBODIMENTS

Figure 1:
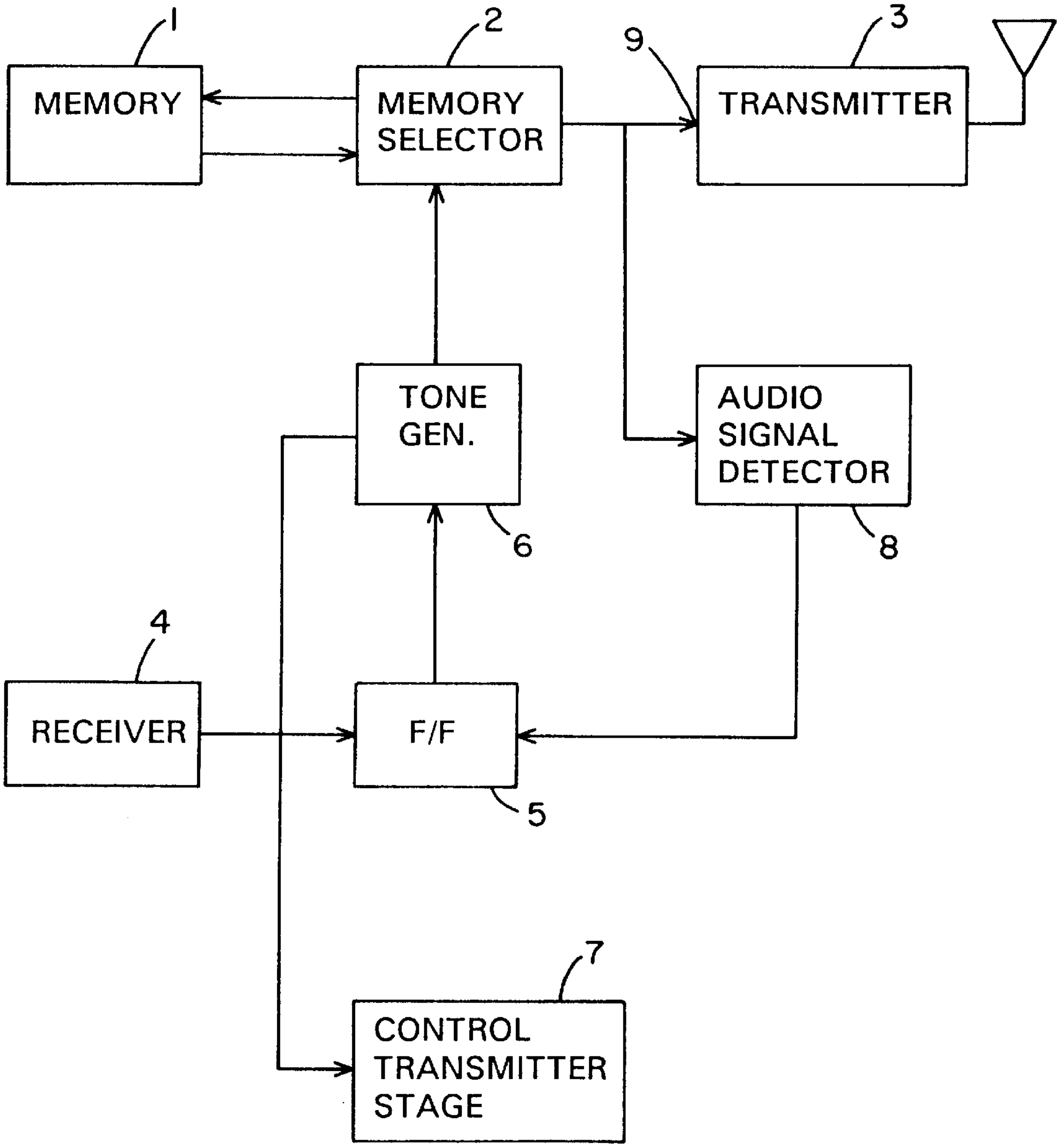
FIG. 1 is a block diagram of a transmitter unit according to a first embodiment of the present invention.

Refering first to FIG. 1, the transmitter unit illustrated in block diagram form therein comprises a memory 1 wherein at least one information voice message is recorded, to be transmitted when the memory 1 is enabled by means 2 such as a memory selector. The selector 2 responds to a "transmit enable" signal by enabling the memory 1 and addressing the first message to be transmitted. Thereafter, the selector addresses the next message recorded in the memory 1 each time a new "transmit enable" signal is received at the selector 2. The selected message proceeds in signal form to a transmitter stage 3 for sending out in a manner to be received by a mobile receiver unit inside an area proximal thereto.

Such a mobile receiver unit transmits a "listening" control signal generally continually, which is picked up by a receiver stage 4 in the transmitter unit to set a flip-flop 5 which enables a tone generator 6. In response, the tone generator 6 issues the "transmit enable" signal to prompt the selector 2 to begin sending the message and, at the same time, drives a control transmitter stage 7 to send a wireless "sending" control signal to the receiver unit to enable the latter to receive the information message. The voice message may be preceded by a tone burst from the generator 6 to call a user's attention at the receiver end.

The message signal at the input 9 of the transmitter is further sampled by an audio signal detector 8, which resets the flip-flop 5 when the message ends to terminate communications between the transmitter and receiver units.

Figure 2:
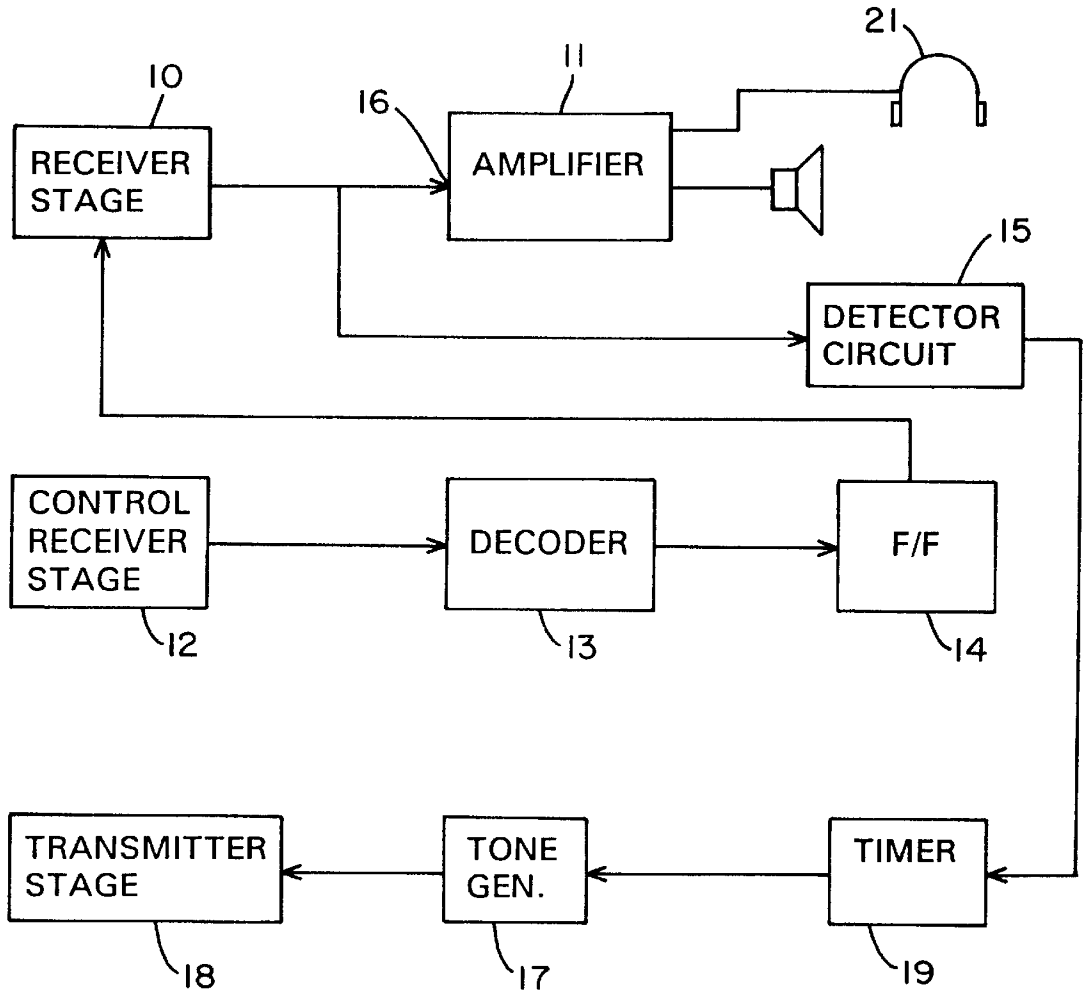
FIG. 2 is a block diagram of a receiver unit according to the first embodiment of the present invention.

FIG. 2 illustrates a receiver unit operatively couplable to the transmitter unit of FIG. 1 upon entry into a range area thereof. The wireless voice message signals are received at a receiver stage 10 followed by an audio amplifier 11. The amplifier 11 receives the voice message signals and relays them on to a loudspeaker or a pair of earphones which conveys the message in useful audible form to a user. In an application of the transmitter-receiver system of the invention in a supermarket, the loudspeakers may be mounted on supermarket push-carts so as to be directly available to each customer.

A control receiver stage 12 detects the "sending" control signal from the transmitter unit and passes it on to a decoder circuit 13. In response to receipt of the "sending" signal, the decoder 13 triggers a multivibrator circuit or flip-flop 14. The input 16 to the amplifier 11 is sampled by a detector circuit 15 to keep the flip-flop 14 set until the message ends or reception thereof is interrupted, such as may happen if the user moves out of range of the area of the transmitter unit.

The receiver unit further comprises a tone generator 17 driving a transmitter stage 18 for sending the above-referred "listening" signals to the receiver stage 4 of the transmitter unit. The tone generator 17 is temporarily disabled for a predetermined time-interval, which may be a few seconds or a few minutes long per choice of design, by a timer 19 each time the detector 15 indicates termination of the voice message, in order to provide a silent interval between one message and another, for instance if the transmitter unit transmits multiple messages or the receiver unit crosses directly from the area of one transmitter unit into another.

Figure 3:
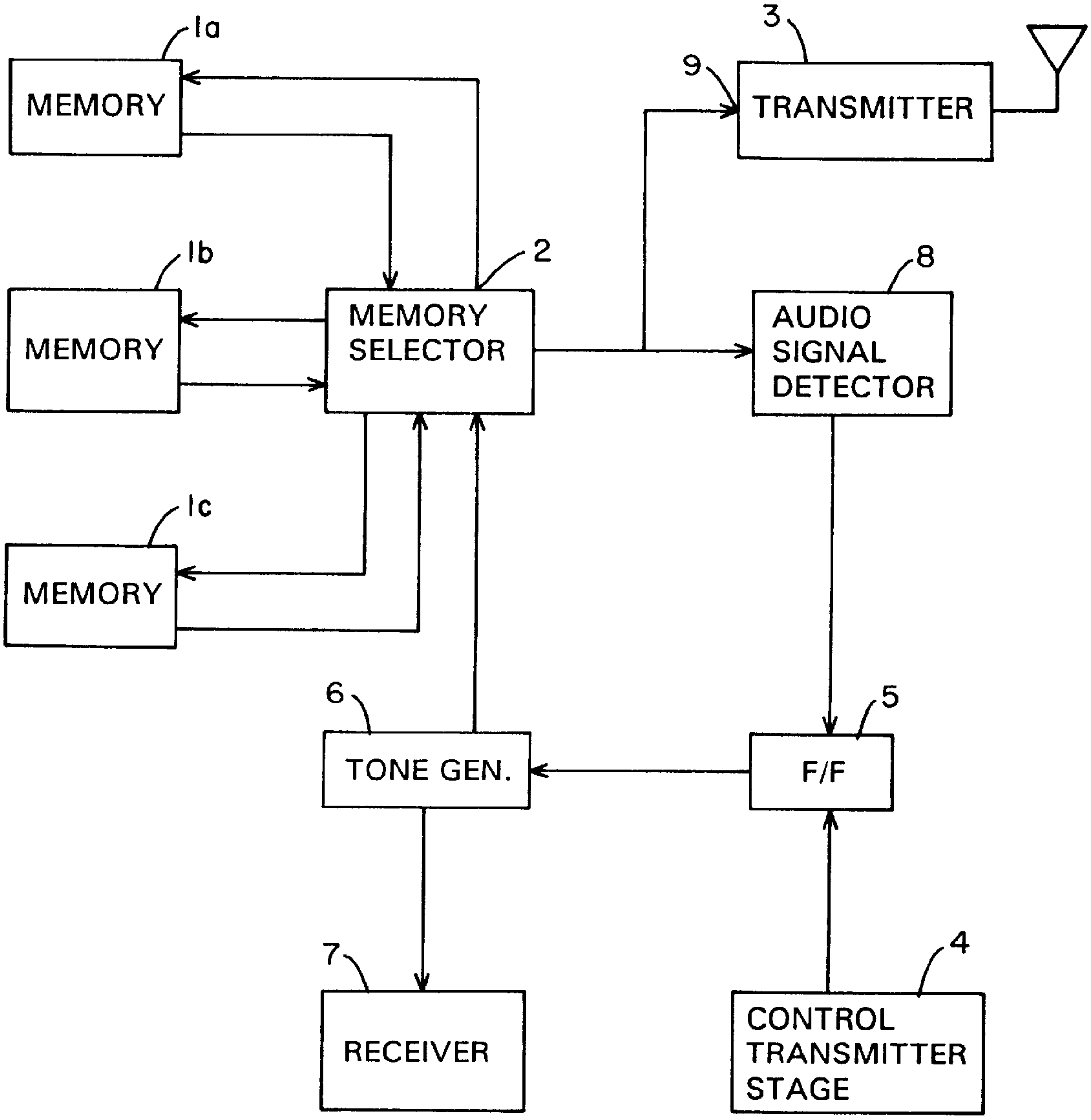
FIG. 3 is a block diagram of a transmitter unit according to a second embodiment of the present invention.
Figure 4:
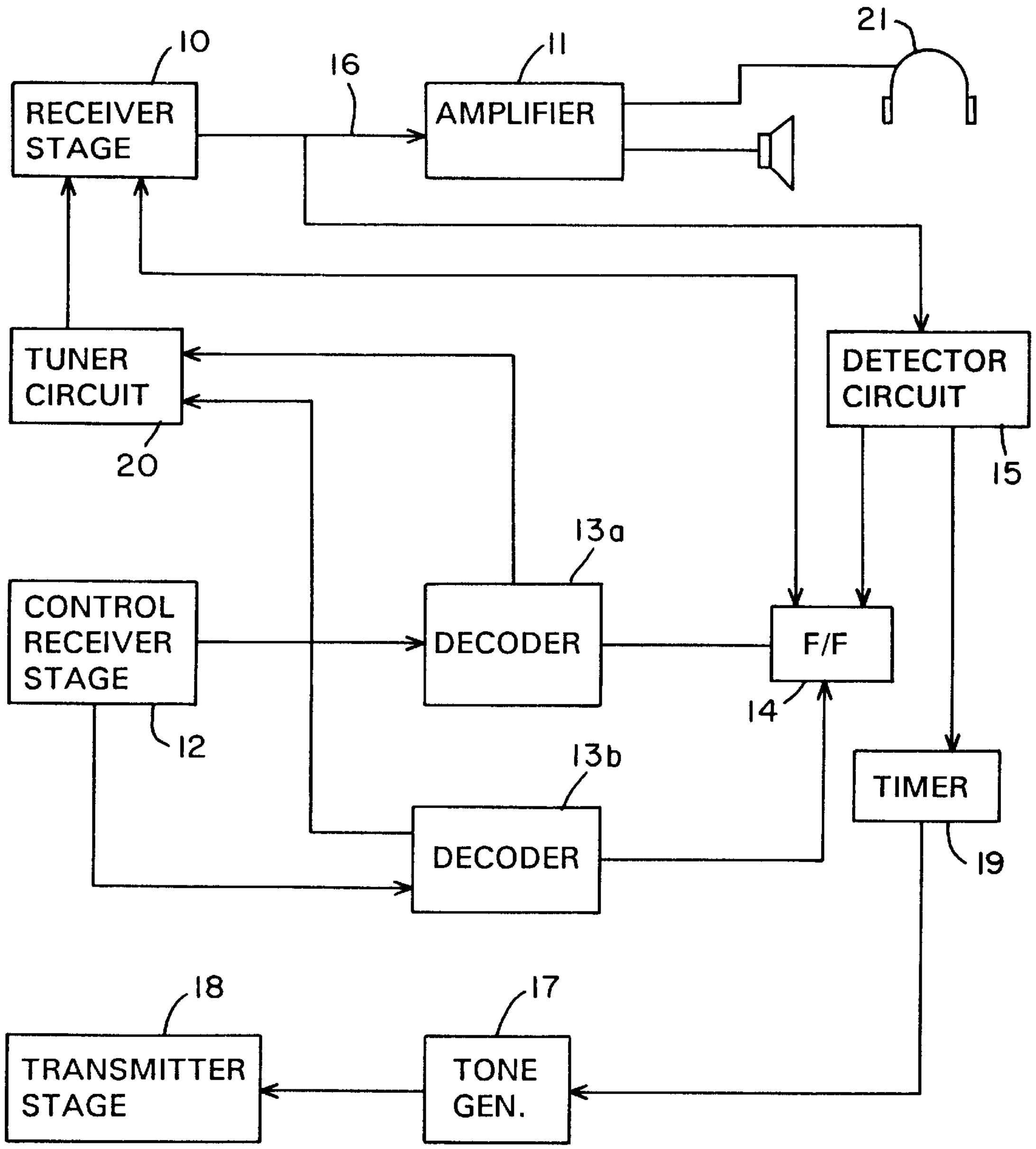
FIG. 4 is a block diagram of a receiver unit according to the second embodiment of the present invention.

FIGS. 3 and 4 show a second embodiment of the invention based on the same principles as the above-described first embodiment. The same reference numerals are used for like parts which are not further described in relation to this second embodiment. The transmitter unit of FIG. 3 comprises a plurality of selectable memories 1A, 1B and 1C.

The selector 2 may be designed or programmed to cycle through all the memories before recycling back to the first memory 1A, sending out each message therein in turn to a receiver unit within range, or alternatively may include means to preselect just one memory 1A, 1B or 1C to cycle through. The former alternative may be preferable in a supermarket application, to accomodate various messages in each transmitter unit, while the latter alternative is suitable for a museum which may be visited by people of different languages, each memory 1A, 1B and 1C recording messages in a different language.

Power output of the messages transmitter stages 3 may be specified at 1 watt or less. In the embodiments of FIGS. 1 and 3, the tone generator 6 issues single-frequency control signals of one of two presettable frequencies to cause the transmitter stage 3 to generate a carrier of a selected one of two predetermined carrier frequencies. This enables transmitter units to be located near one another without interference. When a roaming receiver unit hooks on to a transmitter unit by means of its "listening" signal, the transmitter unit responds by issuing the "sending" tone signal through stage 7, wherein the tone frequency encodes the carrier frequency. To this end, the control receiver stage 12 in FIG. 4 is connected to a pair of decoders 13A and 13B, each designed to discriminate a different one of the control frequencies. Thus, the decoder 13A, 13B tuned to the selected frequency outputs a true signal to a tuner circuit 20 which tunes the message receiver stage 10 to the selected carrier frequency. A transmitter unit close by within interference range will be programmed to the other carrier frequency, deaf to the receiver stage 10 listening to the other unit.

The operation of the rest of the receiver unit circuit in FIG. 4 is like the circuit of FIG. 2, the set input of the flip-flop 14 being ORed to the outputs of both decoders 13A and 13B.

Figure 5:
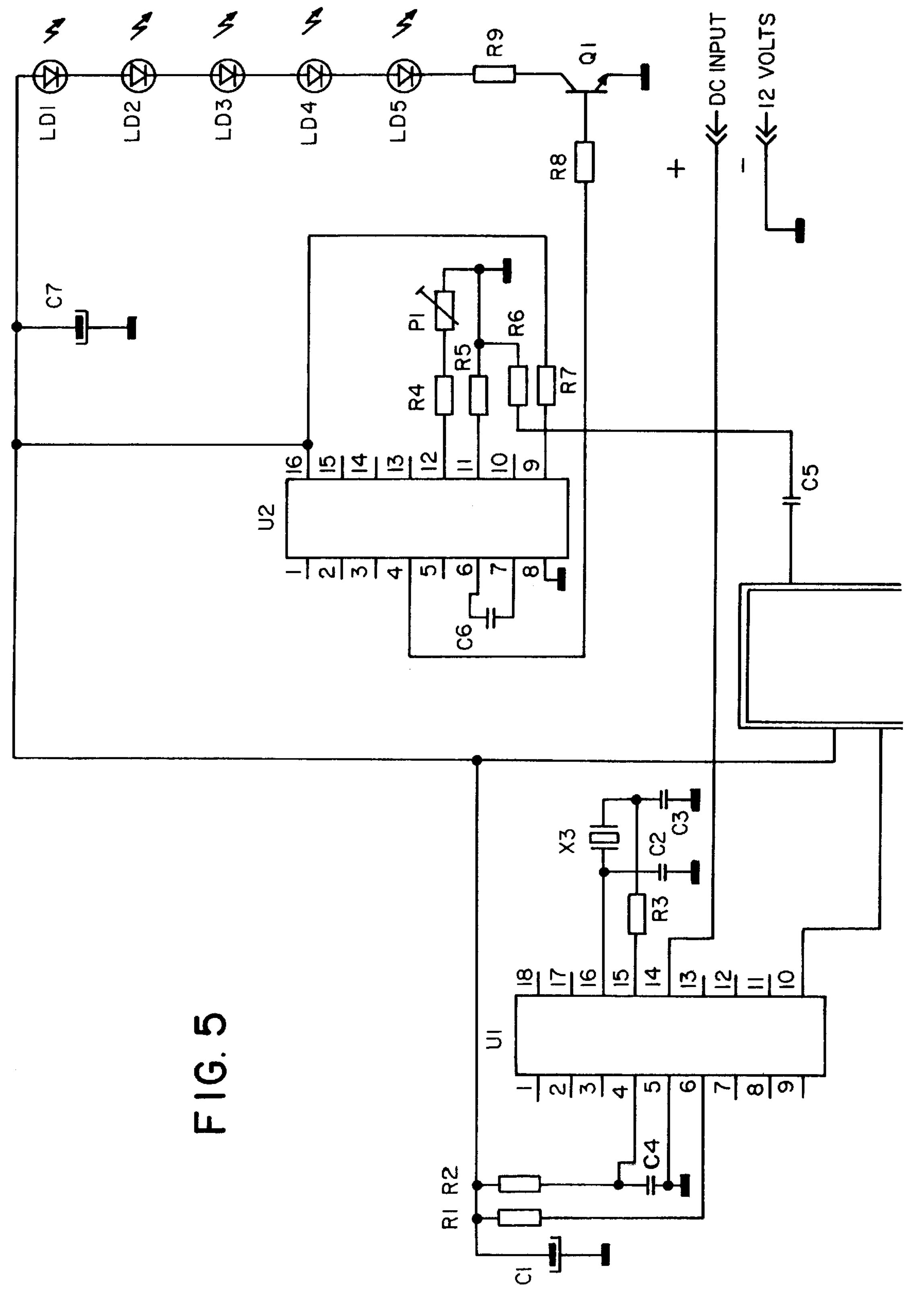
FIG. 5 is a schematic of an electronic circuit for a transmitter unit according to the first embodiment of the present invention.

Two alternative circuits implementing the first embodiment are described hereafter, begining with FIG. 5 which illustrates a transmitter unit using integrated-circuit technology for modulating a radiofrequency carrier with a voice message recorded in a memory module M1. Memory module M1 is preferably an ISD 1000 A integrated circuit comprising digitally-addressed analog cells for recording a 20-second long audio or voice message; although other non-volatile record means may be used such as magnetic tape cassettes or compact optical disks. The overall contro functions, including the selector and flip-flop functions of FIG. 1, are carried out by a suitable microcontroller unit U1, such as a PIC 16 C 84 12-bit microcontroller, programmed with the routine charted in FIG. 9 described hereinafter.

An infrared optical receiver U3, such as an IS1U60 device, receives a "listening" control signal from a receiver unit to be described hereinafter, upon entry into the range of the transmitter unit. The infrared receiver U3 relays the control signal to the microprocessor U1 which responds by generating a single-tone control signal which actually encodes a "sending" data. The "sending" signal issues from pin 9 of the microcontroller U1 through a 2.2 kohm resistor to a transistor Q6. This transistor Q6 is a power transistor, such as a 2N 2222 device, which powers infrared transmitters LD1 and Ld2 to convey the "sending" control signal to the nearby receiver unit. Two series-connected LBT 53FT B3 devices are used as infrared transmitters for range and reliability.

At the same time, the microcontroller U1 issues a "transmit enable" signal via a base resistor R11 and a transistor switch Q5, preferably a 2N 2907 transistor, to activate memory M1 to play back a first message recorded therein. The message memory output is coupled by a 0.1 $\mu$F capacitor C21 to modulate a radiofrequency carrier generated within a transmitter stage module M2. The module M2 is preferably a Radio Shack TRC512 device, complete with RF oscillator, FM modulator and RF power output functions to supply a voice-message-modulated radiosignal to an antenna connected thereto for transmission into the area proximal thereto.

The memory module M1 is programmed to cycle through different messages or to recycle back to the first message as long as the receiver unit is within range. When the receiver unit moves out of range or when the receiver unit detects an end of message, that is no audio signal to amplify, then sensor U3 stops receiving the infrared "listening" control signal and microcontroller U1 responds by switching transistors Q5 and Q6 off.

Figure 6A:
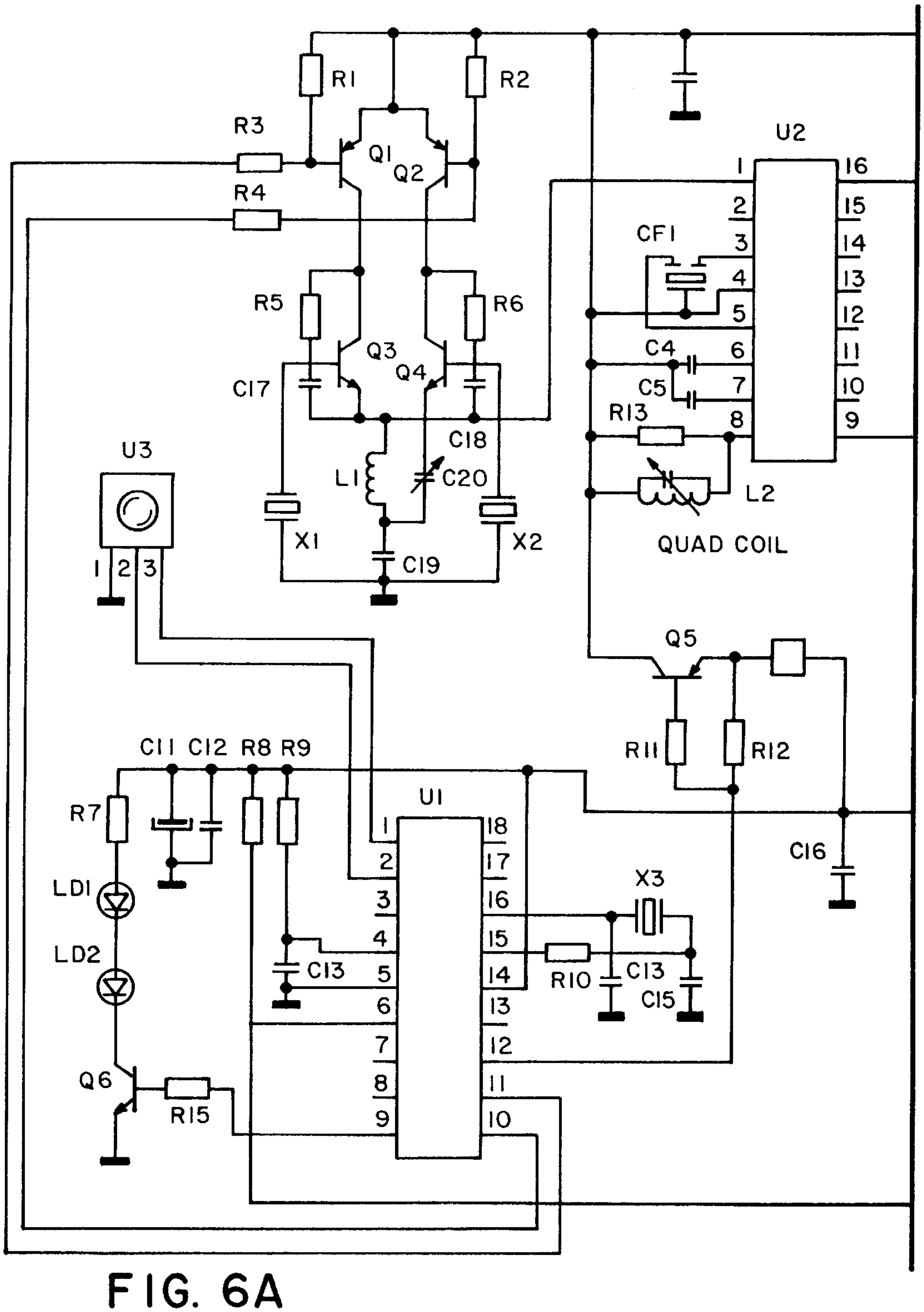
FIG. 6 is a schematic of an electronic circuit for a receiver unit according to the first embodiment of the present invention.
Figure 6B:
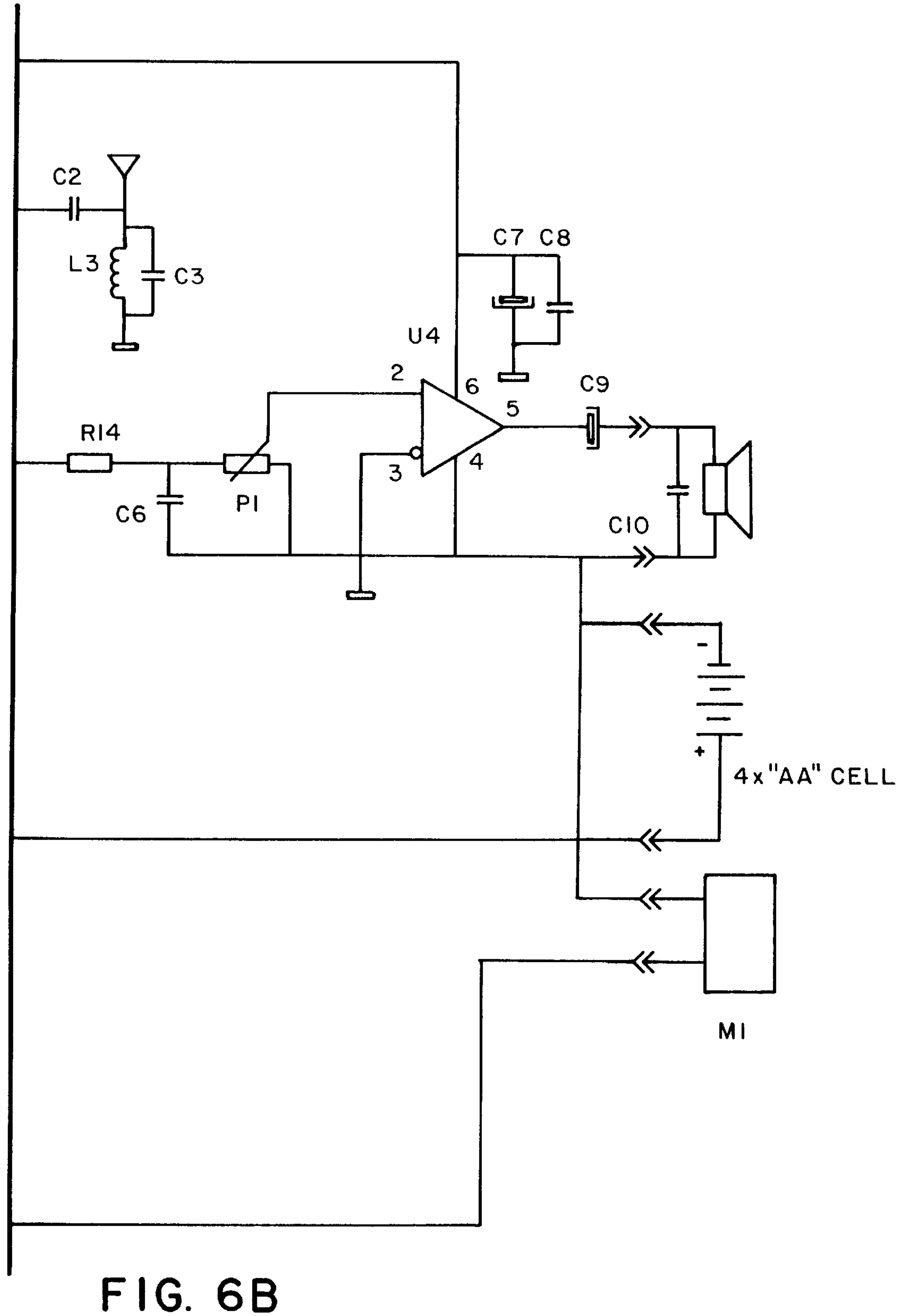

FIG. 6 illustrates a battery-operated receiver unit for mounting to a supermarket push-cart. A wheel of the push-cart (not illustrated) is coupled to a movement sensor module M3 which powers the electronic circuit down when the push cart is not in use, in order to save battery life. The control functions of this unit are carried out by a PIC 16 C 84 microcontroller U1, programmed with the routine charted in FIG. 10 described hereinafter.

An infrared receiver unit U3 receives a "sending" control signal from a transmitter unit when in the range thereof. At this stage, this control signal is interpreted as "ready to send" and it contains data in order for the microcontroller U1 to determine if it wants to receive the message. In the affirmative, it issues a "listening" control signal via resistor R15 and transistor Q6 to be relayed wirelessly via emitters LD1 and LD2. All these components are similar to like components of the transmitter unit of FIG. 5.

In order to enable reception of the message signal carrier, pin 12 of the microcontroller U1 generates a signal through transistor Q5 to power the rest of the circuit up, including the receiver stage centred on an FM decoder circuit U2, preferably an MC 3361 device. The "sending" control signal has one of two preselected carrier frequencies encoded therein, causing the microcontroller to issue a true signal from a corresponding one of pins 10 or 11 thereof, to enable either oscillator circuit O1 or, alternatively, oscillator circuit O2, to tune the FM receiver stage U2. A capacitor C20 may be adjusted to the required frequency. For instance, the preselectable carrier frequencies may be 49.405 MHz and 49.435 MHz, respectively.

The audio or message signal is recovered by means of a ceramic filter CF1 and a quad coil and outputted by pin 9 of decoder U2 to an audioamplifier U4, for instance an LM 386 integrated circuit, for conveyance to a loudspeaker mounted on the pushcart.

Figure 7:
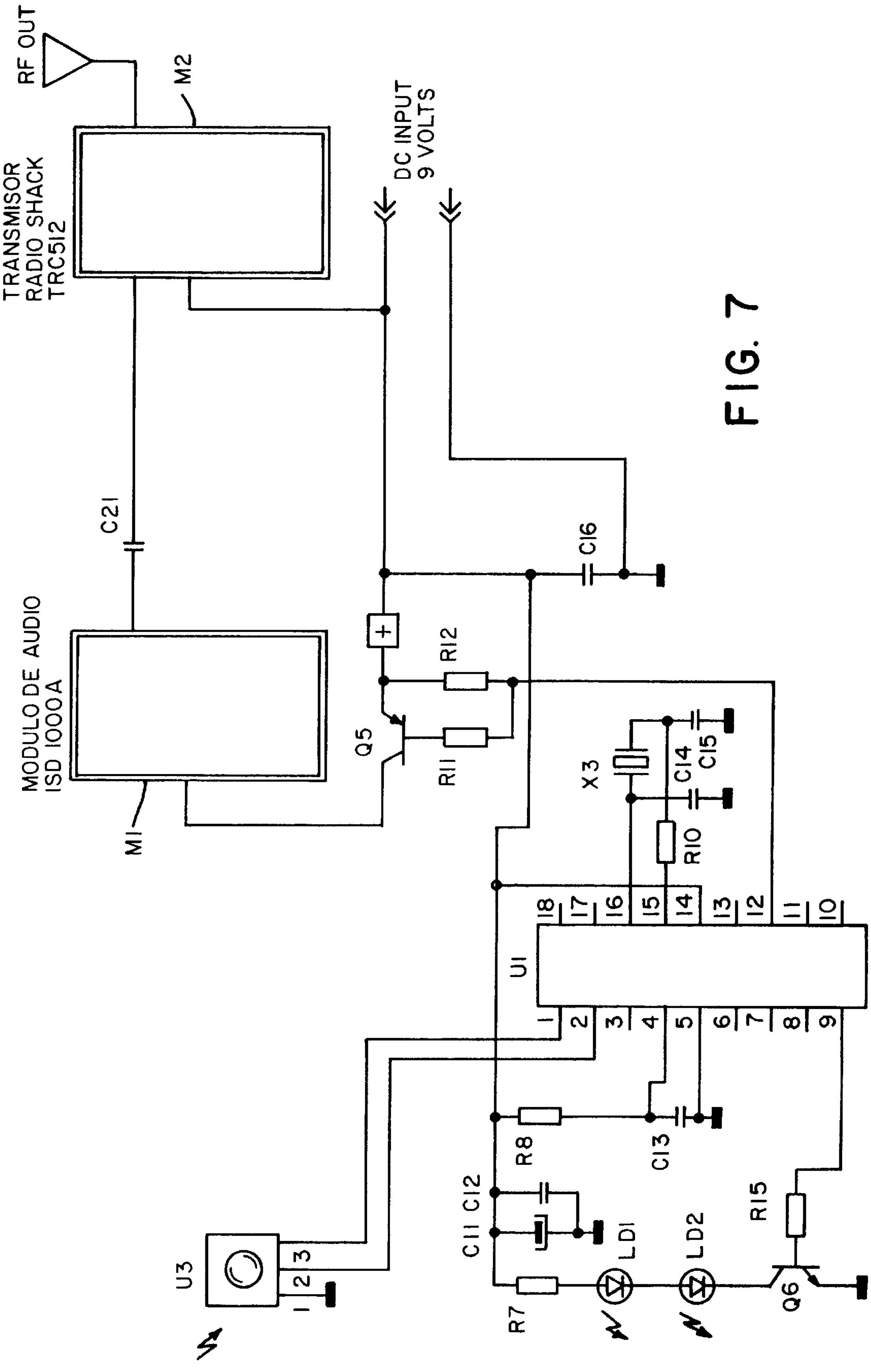
FIG. 7 is a schematic of an alternative electronic circuit for a transmitter unit according to the first embodiment of the present invention.
Figure 8A:
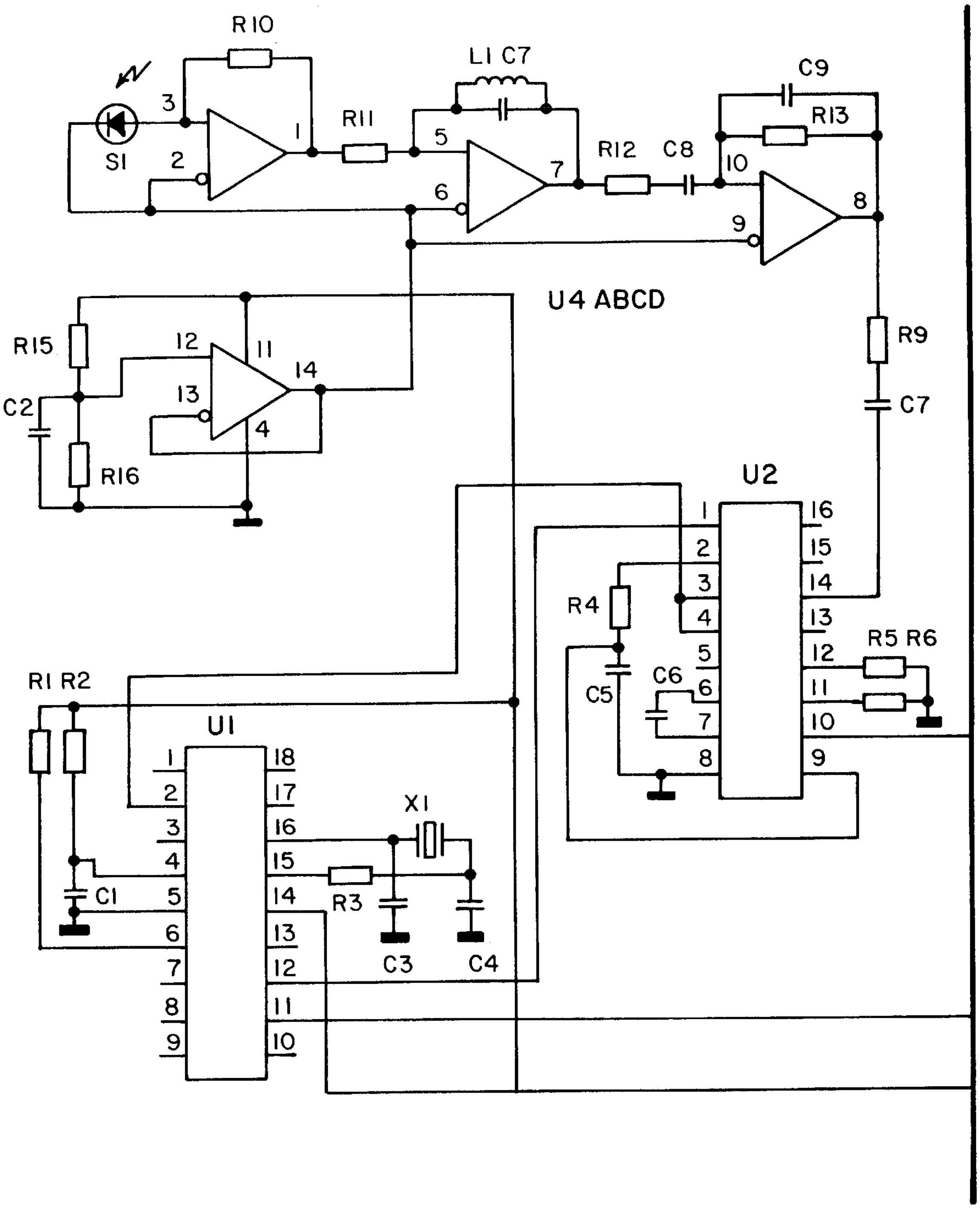
FIG. 8 is a schematic of an alternative electronic circuit for a receiver unit according to the first embodiment of the present invention.
Figure 8B:
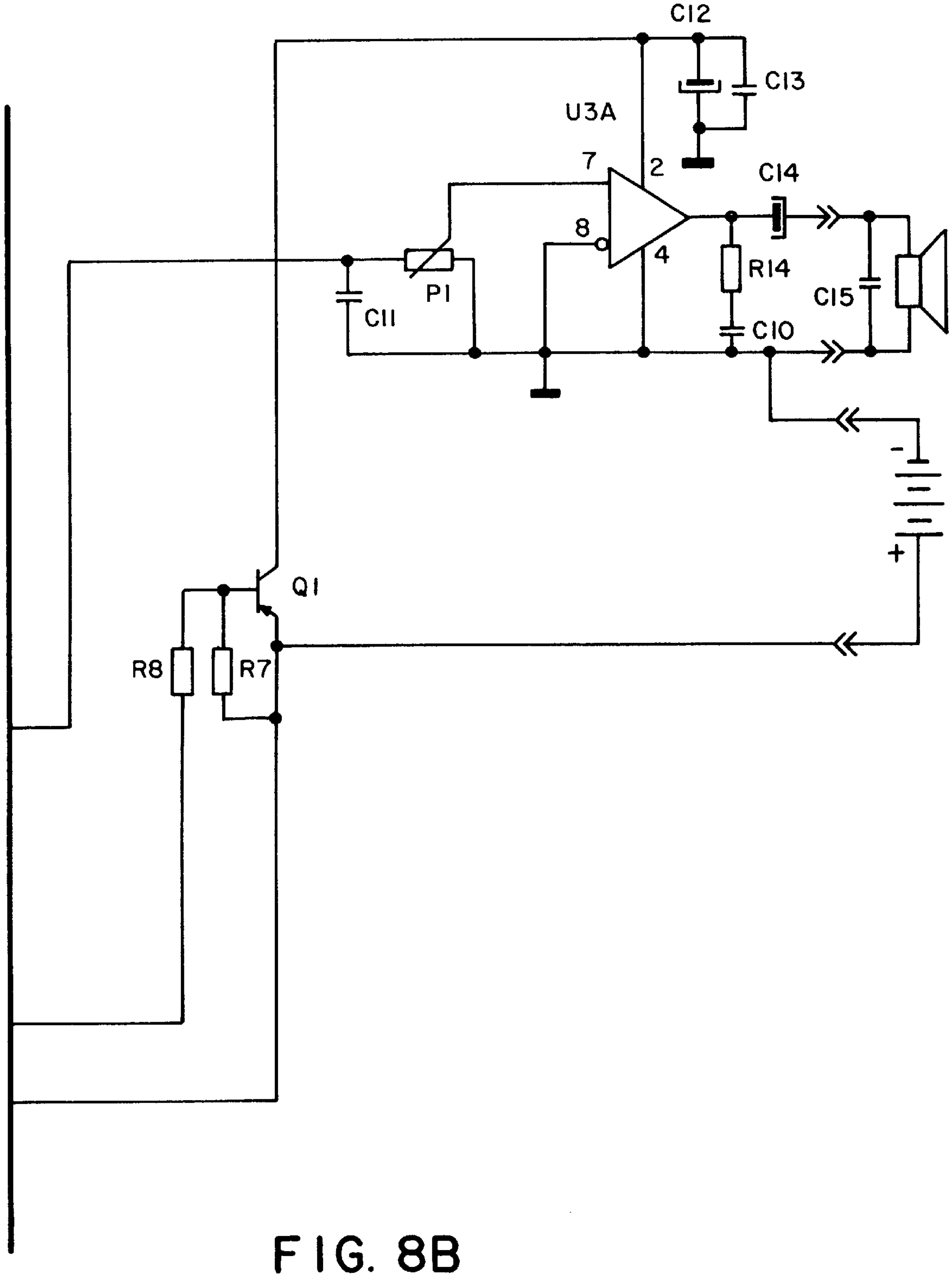

An alternative implementation of the embodiment of FIGS. 1 and 2 is set forth in FIGS. 7 and 8. Basically, this embodiment differs from FIGS. 5 and 6 in that the message signal is an infrared optical signal. Otherwise, the method of operation is similar. An MC 4046 frequency modulator U2 receives a "transmit enable" signal from pin 10 of the PIC 16 C 84 microcontroller U1 and sends a modulated carrier signal to the base of a 2N 2222 transistor Q1. Transistor Q1 drives five serially connected infrared LBT 53FT B3 light-emitter devices to convey the message carried signal to the receiver unit of FIG. 8 when in range thereof.

According to FIG. 8, a quadruple amplifier U4 conditions and amplifies the infrared message contained signal received by a MRF 901 infrared sensor S1. The signal is passed through filter L1-C7 and acts on an MC 4046 phase-locked loop (PLL) circuit U2 which decodes the audio signal therefrom. The message signal proceeds from pin 10 of PLL circuit U2 to the amplifier U4 and thereonto the loudspeaker.

Figure 9:
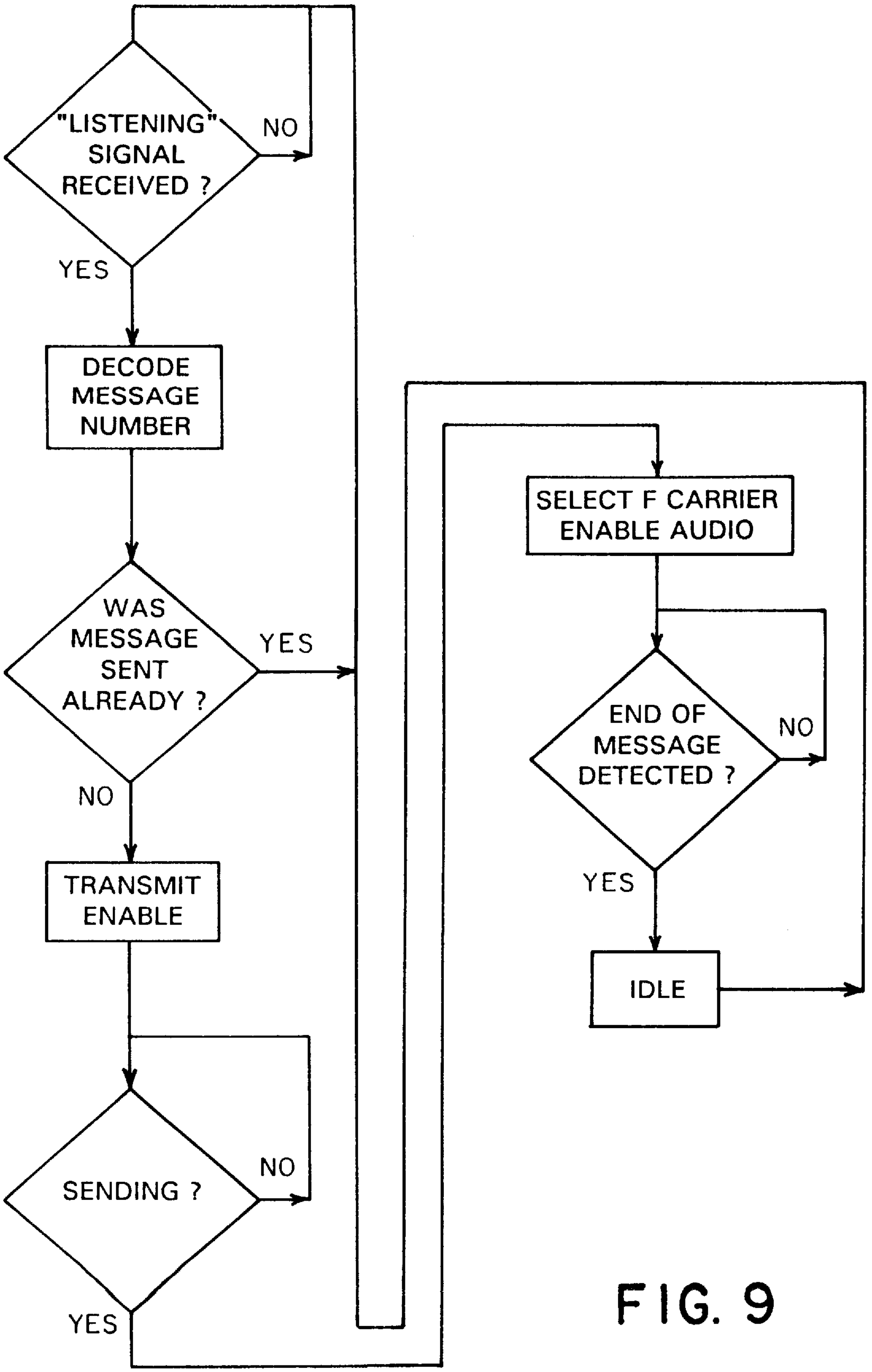
FIG. 9 is a flow chart of the operation of the transmitter unit of FIG. 5 according to the method of the invention.
Figure 10:
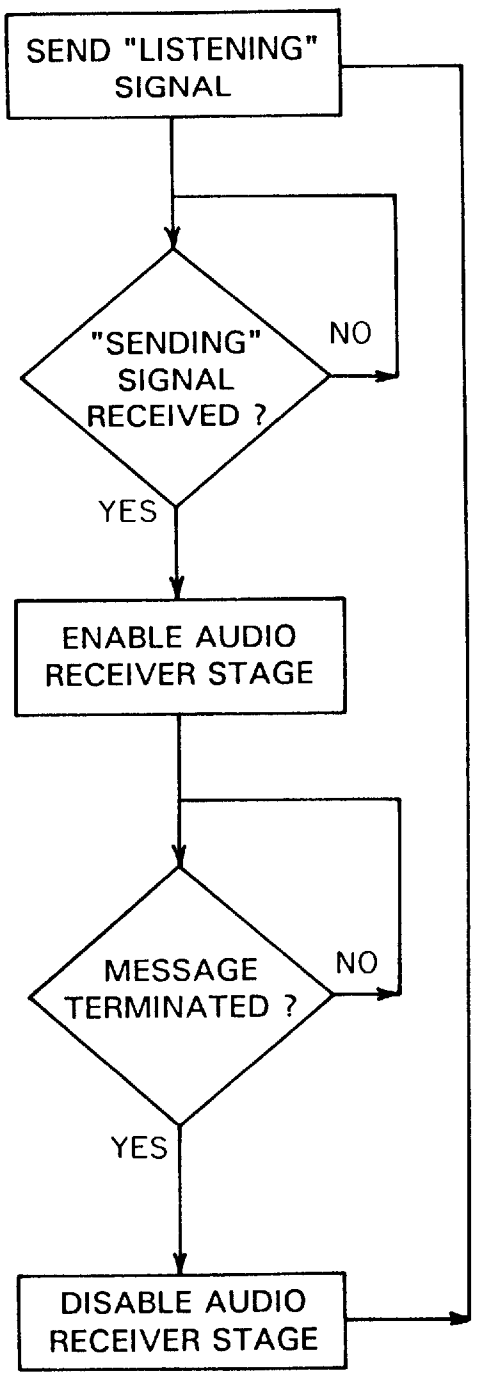
FIG. 10 is a flow chart of the operation of the receiver unit of FIG. 6 according to the method of the invention.

The method of operation referred to herein is summarized by the flow charts illustrated in FIGS. 9 and 10, which refer particularly to the example of FIGS. 5 and 6 of the first embodiment, although basically similar to the example of FIGS. 7 and 8. Step 100 reloops until a "listening" signal is received at control receiver stage 4, U3, whereafter step 110 decodes the signal and step 120 checks whether it comes from a new receiver entering the transmitter area. This avoids repeting the message to a chart left in the area.

Step 130 instructs the microcontroller 5-6, U1 send the transmitter module M2 the "transmit enable" signal in order to start transmitting the message after step 140 has waited for receipt of a "start sending" signal and step 150 has selected the carrier channel and enabled the audio module M1. Transmission proceeds nested in loop 160 thereafter from module M2 until module M1 outputs an "end of message" byte. Thereafter, transmission is disabled, modules M1 and M2 are inhibitted and the unit returns in step 170 to the idling loop 100 until a new receiver unit enters the area.

The receiver microcontroller is programmed to send "listening" control signals in step 200 and wait for a return "sending" signal in step 210, whereafter the RF in and audio stages 10–11, U2–U4 are enabled. Step 220 waits for a reset signal audio detector 15 to cause step 230 to disable said stages and return to step 200 to resume sending "listening" infrared signals until silencer 15 times out.

The restrictive description and drawings of the specific embodiment examples are to enable one skilled in the art to make and use the invention. The purview of the invention and the scope of patent protection are measured and defined by the ensuing claims.

We claim:

1. In a system comprising at least one means for wirelessly transmitting recorded information messages in a first area proximal thereto and at least one mobile means roaming around a second area including said first area for receiving said transmitted messages when in said first area; a method for selectively establishing a link for said receiving means to receive said messages from said transmitting means when inside said first area, said method comprising the steps of:

(a) sending a control signal from said transmitting or said receiving means for pick-up by said receiving or transmitting means whenever said receiving means substantially enters said first area;

(b) picking said control signal up at said receiving or transmitting means and responding thereto by transmitting said information message from said transmitting means into said first area;

(c) enabling said receiving means to receive said message from said transmitting means;

(d) detecting reception of said information message at said receiving means and, in response thereto, continue sending said control signal to said receiving or transmitting means;

(e) continue transmitting said information message into said first area while said control signal is picked up at said receiving or transmitting means;

(f) terminating the link between said transmitting and receiving means when said receiving or transmitting means stops receiving said control signal; and (g) stop sending said control signal upon termination of the transmitted message.

2. A method according to claim 1, wherein said control signal is transmitted by said transmitting means substantially continually into said first area, said further comprising the steps of detecting said control signal at said receiving means upon entry into said first area and sending a "listening" control signal from said receiving means back to said transmitting means to cause said transmitting means to begin transmission of said message.

3. A method according to claim 1, wherein said recorded messages and control signals are transmitted wirelessly via radio signals.

4. A method according to claim 1, wherein said recorded messages are transmitted wirelessly via radio signals and control signals are transmitted wirelessly via optical infrared signals.

5. A method according to claim 1, wherein said recorded messages are voice messages.

6. A method according to claim 1, comprising the steps of:

(a) sending a "listening" control signal from said receiving means for pick-up by said transmitting means whenever said receiving means substantially enters said first area;

(b) picking said "listening" signal up at said transmitting means and responding thereto by transmitting said information message from said transmitting means into said first area;

(c) enabling said receiving means to receive said message from said transmitting means;

(d) detecting reception of said information message at said receiving means and, in response thereto, continue sending said "listening" control signal to said transmitting means;

(e) continue transmitting said information message into said first area while said "listening" signal is picked up at said transmitting means; and (f) terminating the link between said transmitting and receiving means when said transmitting means stops receiving said "listening" control signal.

7. A method according to claim 6, wherein said receiving means interrupts sending said "listening" signal for a preselected time interval in response to detecting said message being interrupted in step (c).

8. A method according to claim 6, further comprising the steps of:

(g) issuing a "sending" control signal from said transmitting means into said first area in response to picking said "listening" signal up at said transmitting means; and (h) detecting said "sending" control signal at said receiving means and responding thereto by enabling reception of said information message thereat.

9. A method according to claim 8, wherein said transmitting means includes a plurality of audio messages recorded therein and transmits a sequentially different message each time said transmitting means detects a new such "listening" control signal from a said receiving means entering said first area.

10. A method according to claim 8 in a system including a plurality of transmitting means at different fixed locations associated with respective first areas, wherein each of said transmitting means includes different messages prerecorded therein.

11. A method according to claim 10, wherein each said transmitting means is adjusted to transmit at a respective preselected transmission carrier frequency and said "sending" control signal transmitted in step (g) encodes the carrier frequency of said message to be transmitted in step (b) and said step (h) includes decoding said carrier frequency from said "sending" control signal and tuning said receiving means to the decoded carrier frequency.

12. A method according to claim 10 in a system including a plurality of receiving means roaming generally randomly in said second area, wherein said steps (a) through (h) are carried out for each receiving means entering a respective one of said first areas associated with a corresponding transmitting means.

13. A system comprising at least one generally fixed unit for wirelessly transmitting recorded information messages in a first area proximal thereto and at least one mobile unit for roaming around a second area including said first area for receiving said transmitted messages when in said first area, said system further comprising means for selectively establishing a link for said receiving unit to receive said information messages from said transmitting unit when inside said first area;

(a) wherein each fixed unit comprises:
  (i) storage means for storing signals defining the contents of at least one information message pertaining to said fixed unit, said information message including a beginning and an end,
  (ii) receiving means for receiving a "listening" control signal from one such mobile unit entering into said first area,
  (iii) detecting means for detecting the presence of said "listening" control signal at said receiving means and generating in response thereto a "transmit enable" signal, and
  (iv) first transmitting means responsive to said "transmit enable" signal to retrieve an information message from said storage means and transmit the retrieved message into said first area;
  (v) end-of-message means for detecting said end of said information message being transmitted to thereby inhibit said "transmit enable" signal until said detecting means receives said "listening" control signal from a different one such mobile unit; and
(b) wherein each mobile unit comprises:
  (i) transmitting means for sending out a "listening" control signal for detection by said receiving means of one such fixed unit,
  (ii) first receiving means for receiving the information message,
  (iii) output means for relaying the received message in useful form.

14. A system according to claim 13, wherein said storage means contains a plurality of said information messages recorded therein and each fixed unit further includes selector means for sequentially selecting one of said recorded messages in response to said detecting means detecting a new "listening" control signal in said receiving means in said fixed unit.

15. A system according to claim 13, wherein said detecting means in each fixed unit further includes flip-flop means for generating said "transmit enable" signal when set, said flip-flop means connected to be set by said receiving means of said fixed unit in response to the presence of said "listening" control signal thereat and to be reset by the transmitted message ending.

16. A system according to claim 13, wherein:

(a) each fixed unit further includes:
  (vi) second transmitting means for transmitting a "sending" control signal in response to said receiving means in said transmitting means receiving said "listening" control signal from one such mobile unit, said end-of-message means inhibiting transmission of said "sending" control signal in response to detecting said end of said information message being transmitted; and
(b) each mobile unit further includes:
  (iv) second receiving means for detecting said "sending" control signal from said fixed unit and generating an "audio enable" signal in response thereto,
  (v) detector means for sampling said output from the first receiving means and deactivating said "audio enable" signal in response to termination or interruption of the received message, said detector means further responding to the presence of said message at said output of said first receiving means to enable said transmitting means of said mobile unit to continue sending out said "listening" control signal to said receiving means of said fixed unit.

17. A system according to claim 16, wherein each fixed unit includes means for setting a carrier frequency for said first transmitting means thereof to transmit said information message, and means for encoding said carrier frequency in said "sending" signal; and wherein each mobile unit includes decoding means for decoding said carrier frequency in said "sending" signal for tuning said first receiving means thereof to said decoded carrier frequency.

18. A system according to claim 17, wherein said setting means in said fixed unit comprises a tone generator connected to said second transmitting means to cause the latter to transmit said "sending" control signal of a frequency encoding said carrier frequency, and said decoding means in said mobile unit comprises a control frequency decoder circuit to determine said carrier frequency.

19. A system according to claim 18, wherein said carrier frequency is settable to one of two preset carrier frequencies and said frequency decoder circuit comprises two frequency discriminator devices tuned to a different preset frequency of said tone generator.

20. A transmitter unit for use in a system comprising a plurality of similar transmitter units spaced apart from one another for wirelessly transmitting recorded information messages in respective first areas proximal thereto within a second area traversed by a plurality of mobile receiver units for receiving a particular one of said transmitted messages when in one of said first areas, said transmitter unit including for assisting in selectively establishing a link with one of said receiving units to receive one of said information messages from said transmitting unit when inside said first area proximal to said transmitter unit, said assisting means comprising;

storage means for storing signals determining the contents of at least one information message, said information message including a beginning and an end,
receiving means for receiving a "listening" control signal from one such mobile receiver unit entering into said first area,
detecting means for detecting the presence of said "listening" control signal at said receiving means and generating in response thereto a "transmit enable" signal,
first transmitting means responsive to said "transmit enable" signal to retrieve an information message from said storage means and transmit the retrieved message into said first area,
end-of-message means for detecting said end of said information message being transmitted to thereby inhibit said "transmit enable" signal until said detecting means receives said "listening" control signal from a different one such mobile receiver unit, and second transmitting means for transmitting a "sending" control signal in response to said receiving means in said transmitting means receiving said "listening"

control signal from one such mobile unit, said end-of-message inhibiting transmitting a "sending" control signal in response to detecting said end of said information message being transmitted.

21. A transmitter unit according to claim 20, wherein said storage means contains a plurality of said information messages recorded therein and said transmitter unit further includes selector means for sequentially selecting one of said recorded messages in response to said detecting means detecting a new "listening" control signal in said receiving means.

22. A transmitter unit according to claim 21, and further including means for setting a carrier frequency for said first transmitting means thereof to transmit said information message, and means for encoding said carrier frequency in said "sending" signal.

23. A transmitter unit according to claim 22, wherein said carrier frequency setting means comprises a tone generator connected to said second transmitting means to cause the latter to transmit a "sending" signal of a frequency encoding said carrier frequency.

24. A transmitter unit according to claim 23, wherein said carrier frequency may be set to one of two preset carrier frequencies.

25. A transmitter unit according to claim 20, wherein said detecting means further includes flip-flop means for generating said "transmit enable" signal when set, said flip-flop means connected to be set by said receiving means of said fixed transmitter unit in response to the presence of said "listening" control signal thereat and to be reset by the transmitted message ending.

26. In a system comprising a plurality of generally fixed transmitter units for wirelessly transmitting pre-recorded information messages in respective first areas proximal thereto within a second area generally including all of said first areas, a mobile receiver unit comprising:

transmitting means for sending out a "listening" control signal for detection by one such fixed transmitter unit upon entry of said receiver unit into said first area corresponding to said transmitter unit, first receiving means for receiving an information message transmitted by said transmitter unit into said first area associated therewith and having an output for relaying the received message in useful form, second receiving means for detecting a "sending" control signal from said fixed unit and generating an "audio enable" signal in response thereto, wherein said second receiving means further includes means for decoding a carrier frequency in said "sending" signal for tuning said first receiving means thereof to said decoded carrier frequency, detector means for sampling said output from the first receiving means and deactivating said "audio enable" signal in response to termination or interruption of the received message, said detector means further responsive to the presence of said message at said output of said first receiving means to enable said transmitting means to continue sending out said "listening" control signal.

27. A receiver unit according to claim 26, wherein said second receiving means includes a multivibrator circuit for generating said "receive enable" signal.

28. A receiver unit according to claim 26, wherein said second receiving means further includes a plurality of parallel frequency discriminator circuits for decoding a carrier frequency in said "sending" signal for tuning said first receiving means thereof to said decoded carrier frequency, said frequency discriminator circuits having an output indicative of a decoded carrier frequency, the outputs of said plurality of discriminator circuits are connected to trigger said multivibrator circuit.

29. A receiver unit according to claim 26, wherein said receiver unit is user-portable and said output of said receiving means is connected to an audio amplifier and to earphone means to enable a user to hear said transmitted message in audible form.

30. A receiver unit according to claim 26, and further including a timer means connected between said detector means and said transmitting circuit for inhibiting said transmitting means from sending said "listening" control signal during a preselected time after said detector means determines that reception of said transmitted message has terminated.

31. A receiver unit according to claim 26, wherein said decoding means comprises a frequency decoder circuit.

32. A receiver unit according to claim 21, wherein said frequency decoder circuit comprises two frequency discriminator devices tuned to a different predetermined frequency.

33. A receiver unit according to claim 26, wherein said receiver unit is mounted on a respective cart and said output of said receiving means is connected to an audio amplifier and a loudspeaker for propagating said transmitted message in audible form to a cart user.

34. A receiver unit according to claim 33, wherein said cart is provided with sensor means for outputting a signal indicative of cart movement and said receiver unit further includes means responsive to said cart movement signal to power-down said receiver unit during substantially no movement of said cart for more than a preselected time.

35. In a system comprising at least one means for wirelessly transmitting recorded information messages in a first area proximal thereto and at least one mobile means roaming around a second area including said first area for receiving said transmitted messages when in said first area; a method comprising the steps of:

(a) sending a "listening" control signal from said receiving means for pick-up by said transmitting means whenever said receiving means substantially enters said first area;

(b) picking said "listening" signal up at said transmitting means and responding thereto by transmitting said information message from said transmitting means into said first area;

(c) enabling said receiving means to receive said message from said transmitting means;

(d) detecting reception of said information message at said receiving means and, in response thereto, continue sending said "listening" control signal to said transmitting means;

(e) continue transmitting said information message into said first area while said "listening" signal is picked up at said transmitting means; and (f) terminating the link between said transmitting and receiving means when said transmitting means stops receiving said "listening" control signal;

(g) issuing a "sending" control signal from said transmitting means into said first area in response to picking said "listening" signal up at said transmitting means and (h) detecting said "sending" control signal at said receiving means and responding thereto by enabling reception of said information message thereat; and (I) stopping issue of said "sending" control signal upon termination of the transmitted message.

* * * * *